United States Patent [19]

Kim

[11] Patent Number: 5,687,159

[45] Date of Patent: Nov. 11, 1997

[54] PICKUP ASSEMBLY FOR A DISK PLAYER

[75] Inventor: Sang-tae Kim, Suwon, Rep. of Korea

[73] Assignee: Samsung Electronics Co., Ltd., Kyungki-do, Rep. of Korea

[21] Appl. No.: 676,641

[22] Filed: Jul. 10, 1996

[30] Foreign Application Priority Data

Jun. 25, 1996 [KR] Rep. of Korea ............... 96-23678

[51] Int. Cl.$^6$ ............... G11B 21/02; G11B 21/24
[52] U.S. Cl. ............... 369/219; 369/244; 369/249
[58] Field of Search ............... 369/215, 219, 369/244, 249; 360/99.01, 114

[56] References Cited

FOREIGN PATENT DOCUMENTS

| 63-124280 | 5/1988 | Japan | 360/104 |
|---|---|---|---|
| 1-287875 | 11/1989 | Japan | 360/114 |
| 2-121165 | 5/1990 | Japan | 369/292 |
| 3-225627 | 10/1991 | Japan | 360/114 |
| 5-189893 | 7/1993 | Japan | 360/69 |

*Primary Examiner*—Robert S. Tupper
*Assistant Examiner*—William J. Klimowicz
*Attorney, Agent, or Firm*—Sughrue, Mion, Zinn, Macpeak & Seas, PLLC

[57] ABSTRACT

A pickup assembly for a disk player has a pair of guide shafts for guiding the movement of a pickup, a fixed holder coupled to one end of each of the guide shafts, a supporting holder having an insertion hole into which corresponding one of the guide shafts is inserted, for supporting an opposite end of each of the guide shafts, and an elastic member installed at the opposite end of each the guide shafts, for elastically biasing each of the guide shafts toward the fixed holder.

6 Claims, 4 Drawing Sheets

PICKUP ASSEMBLY FOR A DISK PLAYER

BACKGROUND OF THE INVENTION

1. Field of the Invention

The present invention relates to a pickup assembly for an optical disk player, and more particularly, to a pickup assembly for an optical disk player in which the assembly and disassembly of guide shafts when replacing a pickup is facilitated.

2. Description of the Related Art

FIG. 1 illustrates a conventional pickup assembly. The pickup assembly includes a pickup 1, a pair of guide shafts 2 for guiding the movement of the pickup 1, and holders 3 for fixing the guide shafts 2 on a deck 4. Further, a gear portion (not shown) engaged with a screw shaft 5, is formed on one side of the pickup 1. In the above pickup assembly, when a driving motor 6, and thus the screw shaft 5, is driven, the pickup 1 reads information recorded on a disk (not shown) mounted on a turntable 7 while moving back and forth along the guide shafts 2 in a known manner.

However, the above-described pickup assembly has a distinct drawback in that the guide shafts 2 are fixed on the deck 4 by the holders 3 which are secured by screws 8. The screws 8 of the holders 3 must be individually removed from the deck 4 and separated from the guide shafts 2 in order to replace the pickup 1. Furthermore, the same task must be performed in reverse order during assembly, thereby requiring a great deal of time for assembly and disassembly.

SUMMARY OF THE INVENTION

To solve the above problems, the object of the present invention is to provide a pickup assembly for an optical disk player which enables quick and simple assembly and disassembly thereof.

To achieve the above object, there is provided a pickup assembly for an optical disk player having a pair of guide shafts for guiding the movement of a pickup, a fixed holder coupled to one end of each guide shaft, a supporting holder having an insertion hole into which the other end of each guide shaft is inserted, and an elastic member installed at the opposite end of each of the guide shafts, for elastically biasing each guide shaft toward the associated fixed holder.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE PREFERRED EMBODIMENTS

Figure 1:
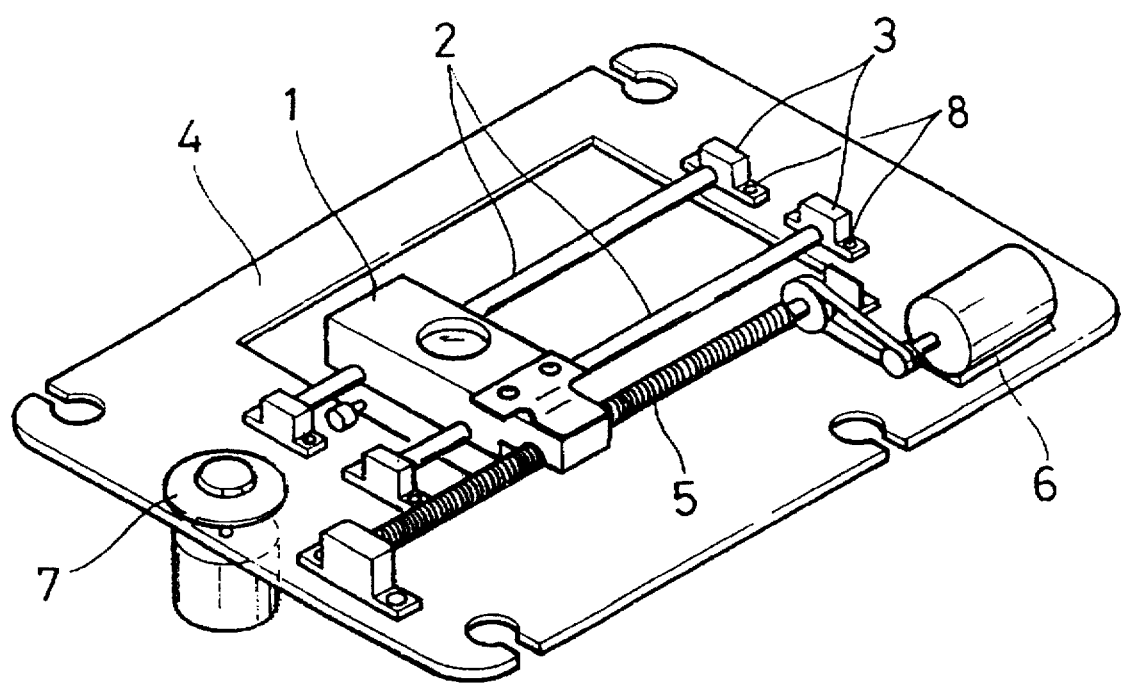
FIG. 1 is a perspective view of a conventional pickup assembly for an optical disk player.
Figure 2:
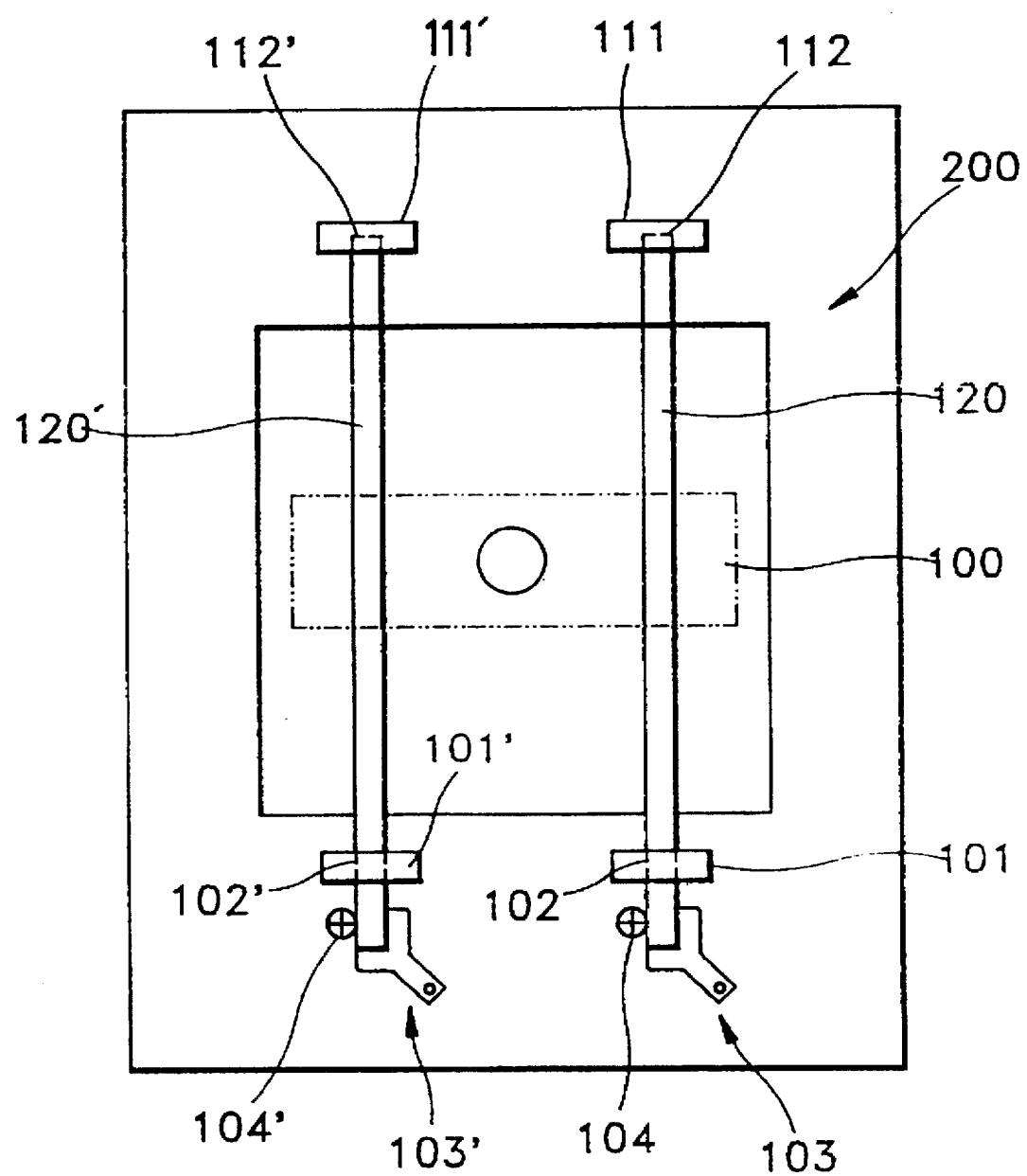
FIG. 2 is a plan view of a pickup assembly for an optical disk player according to a preferred embodiment of the present invention.
Figure 3A:
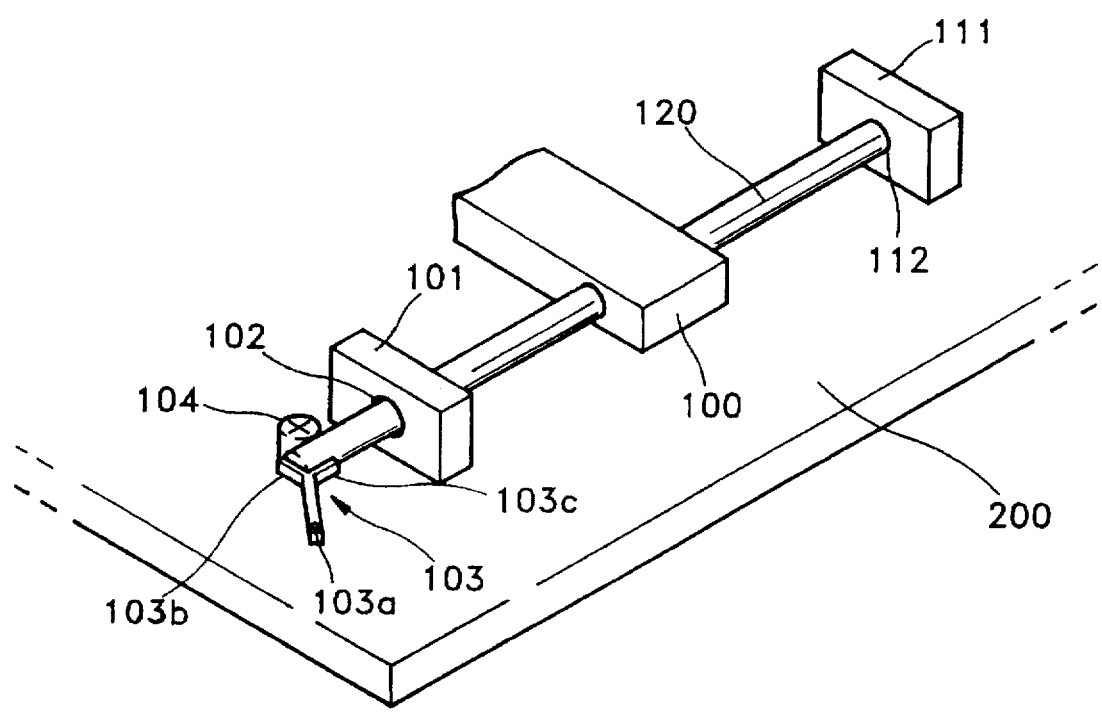
FIGS. 3A and 3B are partial perspective views of the pickup assembly shown in FIG. 2.
Figure 3B:
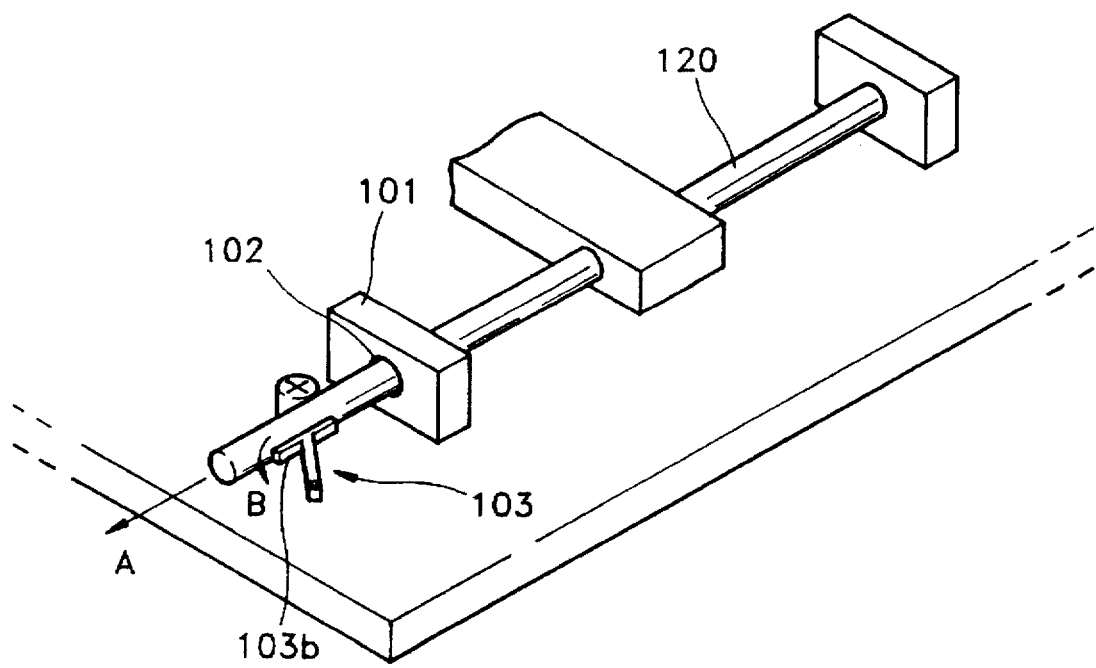

Referring to FIGS. 2, 3A and 3B, supporting holders 101 and 101' having insertion holes 102 and 102', respectively formed therein, and fixed holders 111 and 111' having combining holes 112 and 112', respectively formed therein are installed on a deck 200. Guide shafts 120 and 120' for supporting a pickup 100 in a slidable manner are inserted into the insertion holes 102 and 102', respectively, so that one end of each of the guide shafts 120 and 120' is received in the combining holes 112 and 112', respectively, thereby fixing the guide shafts 120 and 120' to the deck 200. Insertion holes 102 and 102' extend entirely through supporting holders 101 and 101' while combining holes 112 and 112' extend only through a portion of fixed holders 111 and 111'.

Elastic members 103 and 103' are provided at the ends of the guide shafts 120 and 120' opposite the fixed holders 111 and 111', to elastically press the guide shafts 120 and 120' toward the fixed holders 111 and 111'. The elastic member 103 (FIG. 3A) has a fixed portion 103a fixed on the deck 200, a pressing portion 103b extending from the fixed portion 103a and contacting the end portion of the guide shaft 120 for pressing the guide shaft 120 along it axis, and a side supporting portion 103c perpendicular to the pressing portion 103b for supporting a side of the guide shaft 120. The side of the guide shaft 120 opposite the side supporting portion 103c is supported by a supporting member 104. Elastic member 103' is constructed in a similar manner.

When disassembling the above pickup assembly for replacing or servicing the pickup 100, the guide shaft 120 is pulled in the direction of arrow A, as shown in FIG. 3B. As a result, the pressing portion 103b of the elastic member 103, which presses the end portion of the guide shaft 120, elastically deforms about the fixed portion 103a, in the direction of arrow B as shown in FIG. 3B. Thus, the guide shaft 120 can be withdrawn through the insertion hole 102 of the supporting holder 101. For assembly, the pressing portion 103b of the elastic member 103 is elastically deformed in the direction of arrow B, and then the guide shaft 120 is inserted through the insertion hole 102 of the supporting holder 101. Alternatively, elastic member 103 can be rigid and can pivot on the deck against the force of a biasing member. Elastic member 103' functions similarly.

Figure 4A:
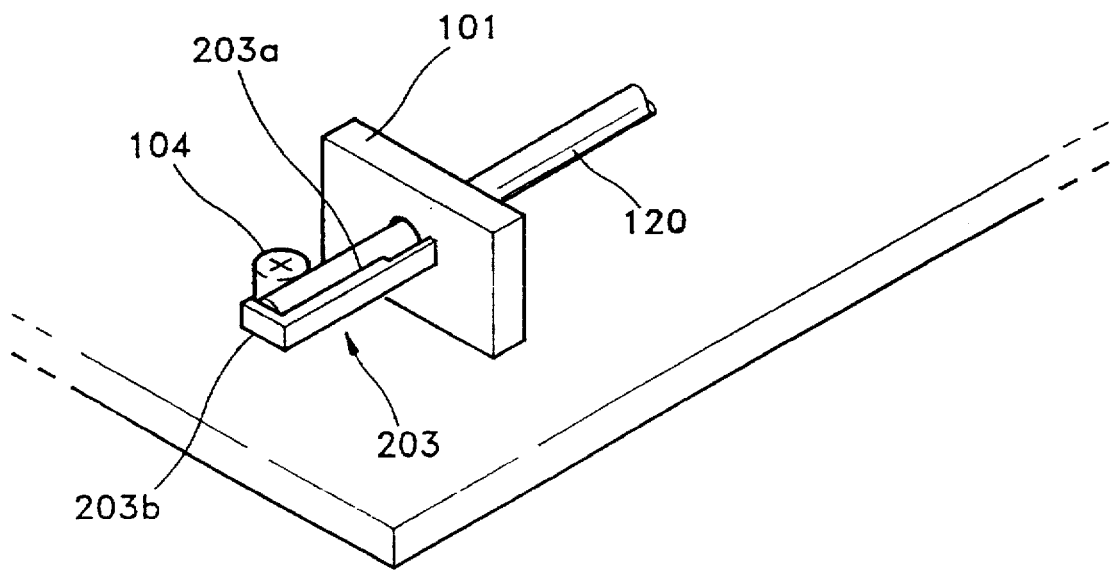
FIGS. 4A and 4B are partial perspective views of a pickup assembly for an optical disk player according to another preferred embodiment of the present invention.
Figure 4B:
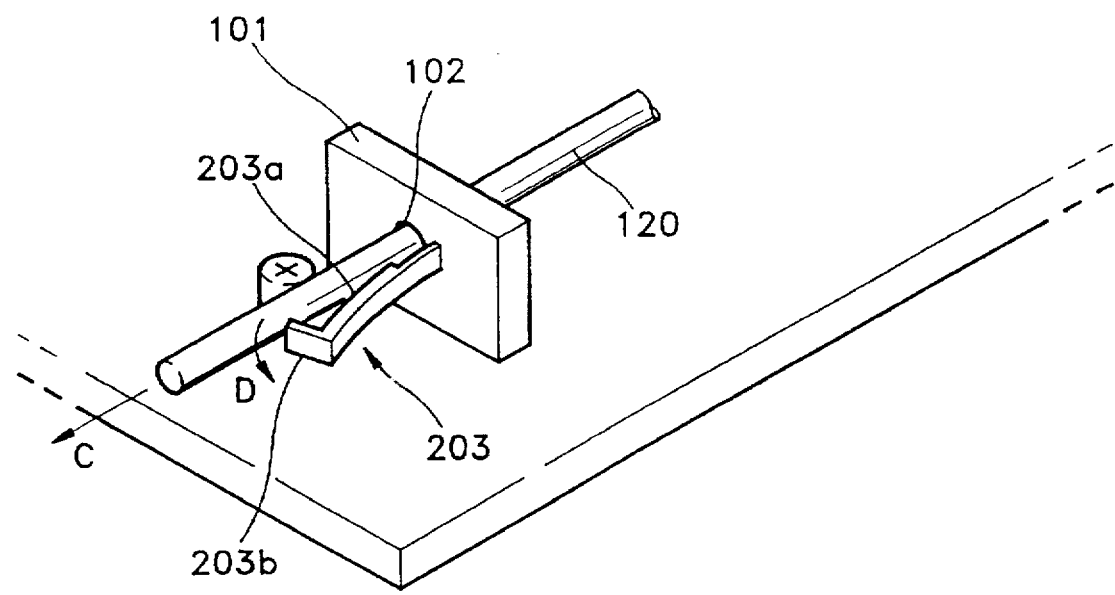

FIGS. 4A and 4B illustrate another preferred embodiment of the pickup assembly of the present invention. Like reference numerals denote the same elements as those of FIGS. 3A and 3B.

In this embodiment, an elastic member 203 is connected to the supporting holder 101 which supports the guide shaft 120. The elastic member 203 includes a side supporting portion 203a for supporting a side of the guide shaft 120, and a pressing portion 203b contacting an end portion of the guide shaft 120, for pressing the guide shaft 120 along the axis of the guide shaft 120.

When disassembling the pickup assembly, the guide shaft 120 is pulled in the direction of arrow C, as shown in FIG. 4B. Then, the pressing portion 203b of the elastic member 203 which presses the end portion of the guide shaft 120 elastically deforms in the direction of arrow D. Thus, the guide shaft 120 is easily withdrawn through the insertion hole 102 of the supporting holder 101. Assembly of the guide shaft 120 is performed in a reverse order. This elastic member can also be a rigid pivoting member. A second elastic member operates in the same manner.

As described above, the pickup assembly of the present invention is easily assembled and disassembled when replacing or servicing the pickup, thereby decreasing the time required for replacement or repair of parts and increasing work efficiency.

While the present invention has been described with reference to preferred embodiments, further modifications will occur to those skilled in the art without departing from the scope of the invention as defined by the appended claims.

What is claimed is:

1. A pickup assembly for an optical disk player, comprising:

a deck;

a pair of guide shafts for guiding the movement of a pickup, each of said guide shafts including one end and an opposite end having an axial end face;

a fixed holder coupled to said one end of each of said guide shafts, for fixing said one end of each of said guide shafts on said deck;

a pair of supporting holders each having an insertion hole through which each of said guide shafts are inserted respectively, for supporting said opposite end of each of said guide shafts; and an elastic member installed proximate said opposite end of each of said guide shafts, for elastically biasing said axial end face of each of said guide shafts so as to bias each of said guide shafts axially toward said fixed holder.

2. The pickup assembly for an optical disk player as claimed in claim 1, wherein each of said elastic members comprises:

a fixed portion fixed to said deck;

a pressing portion extending from said fixed portion and contacting said axial end face of said opposite end of one of said guide shafts, to thereby press said one of said guide shafts axially toward said fixed holder; and a side supporting portion perpendicular to said pressing portion for supporting one side of said one of said guide shafts.

3. The pickup assembly for an optical disk player as claimed in claim 2, further comprising a supporting member opposite each of said side supporting portions, for supporting the other side of said guide shaft.

4. The pickup assembly for an optical disk player as claimed in claim 1, wherein each of said elastic members comprises:

a side supporting portion connected to said supporting holder, for supporting a side of one of said guide shafts; and a pressing portion extending perpendicularly from said side supporting portion for pressing said one of said guide shafts axially from said axial end face of said opposite end of said one of said guide shafts.

5. The pickup assembly for an optical disk player as claimed in claim 4, further comprising a supporting member opposite each of said side supporting portions, for supporting the other side of each of said guide shafts.

6. A pickup assembly for an optical disk player, comprising:

at least one guide shaft for guiding the movement of a pickup, said guide shaft including one end and an opposite end having an axial end face;

a fixed holder combined with said one end of said guide shaft, for fixing said one end of said guide shaft on a deck;

a supporting holder having an insertion hole into which said guide shaft is inserted, for supporting said opposite end of said guide shaft; and an elastic member installed at said opposite end of said guide shaft, for elastically biasing said axial end face of said guide shaft so as to bias said guide shaft axially toward said fixed holder.

* * * * *